Jan. 10, 1950

M. E. SMABY 2,493,931

TRUE AIRSPEED METER

Filed Jan. 19, 1946

INVENTOR.
BY MARCUS E. SMABY

AGENT

Patented Jan. 10, 1950

2,493,931

UNITED STATES PATENT OFFICE 2,493,931

TRUE AIR-SPEED METER

Marcus E. Smaby, Seattle, Wash., assignor to Boeing Airplane Company, a corporation of Delaware Application January 19, 1946, Serial No. 642,362

7 Claims. (Cl. 73—187)

1

My invention relates to the measurement of the speed of a moving object through a fluid, or of a fluid with respect to a reference point, and particularly to the measurement of the true airspeed of aircraft in flight.

It is the principal object of this invention to provide an airspeed indicator which will give the true airspeed, regardless of variations in temperature, pressure, humidity, viscosity, or density of the air. It is a further object to provide an instrument which is relatively simple, rugged, and accurate.

It is common practice to determine airspeed by the measurement of the impact pressure (velocity head) of the air in one way or another. The pitot-static airspeed meters in common usage on aircraft are based upon this principle, as are more elementary devices which measure the forces acting upon flat plates or other objects exposed to the air stream. However, since the impact pressure is a function of air density as well as air speed, it is apparent that any instrument based upon the measurement of impact pressure will give an erroneous reading whenever the conditions vary from standard either in pressure or temperature. This error is large; for example, a standard pitot-static air speed meter indication of 205 M. P. H. at 14,000 feet altitude and a temperature of —10° C. corresponds to an actual airspeed of 252 M. P. H., while the same indication of 205 M. P. H. at 35,000 feet and —30° C. corresponds to a true airspeed of 380 M. P. H. Such large errors render the conventional pitot-static air speed meter of little value as a direct-reading instrument; the indication of the meter is only a starting point for calculations, or for entering a complicated chart, to establish the true airspeed.

Other air speed instruments comprise propellers or the like driven by the airstream, the speed of rotation of the propeller being a measure of the airspeed. The common cup anemometer is one example of this general type. Devices of this nature also are greatly affected by changes in air density, as the aerodynamic forces acting thereon are of course functions of air density.

The present device comprises essentially a propeller of known pitch and symmetrical airfoil section, with static pressure taps symmetrically located on opposite faces of the propeller blade. The instrument is based on the principle that when the propeller is driven at a speed such that the angle of attack of the blade is zero, the airflow about the blade will be symmetrical, the static pressure on opposite faces of the blade will be equal, and the rotational speed of the propeller will be a direct measure of the true airspeed. The device also preferably includes means for driving the propeller, and pressure sensitive means for regulating the speed of rotation.

A more complete understanding of the device may be had by reference to the drawings, in which.

Figure 2:
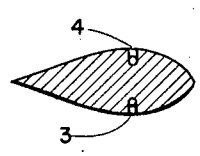
Figure 2 is a sectional view of the blade taken on line 2—2 of Figure 1.
Figure 1:
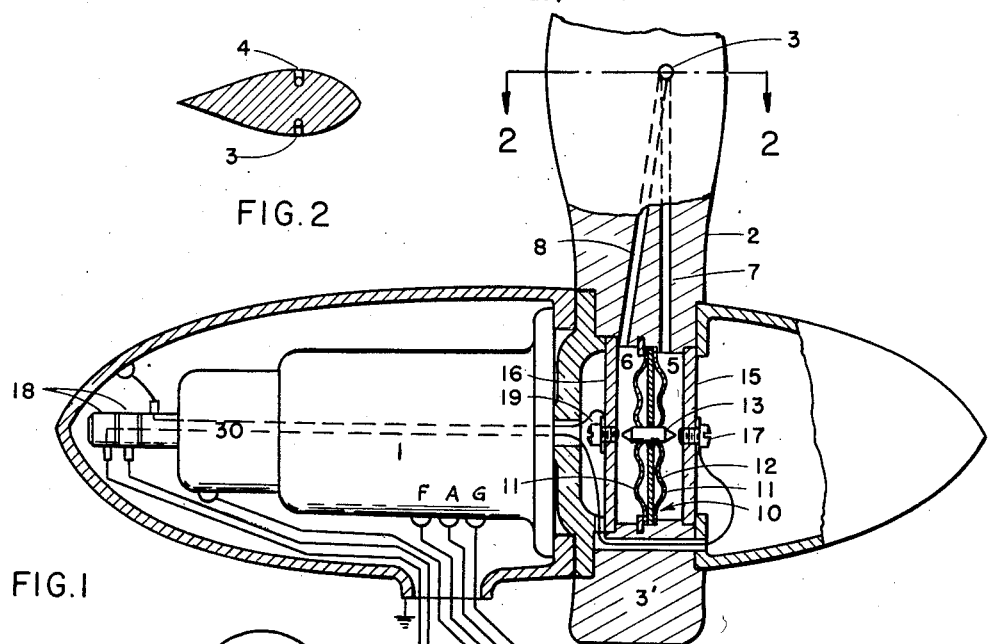
Figure 1 is a somewhat diagrammatic elevational view, partly in section, of a preferred embodiment.

Referring now to Figure 1, it will be seen that the instrument comprises a variable speed electric motor 1 driving a fixed pitch propeller, which may have but a single blade 2, counterbalanced by a weight 3'. The blade is preferably of symmetrical airfoil section, as illustrated in Figure 2, and is provided near the tip with two small openings 3 and 4 symmetrically located on opposite faces, connected respectively to pressure chambers 5 and 6 through conduits 7 and 8. These chambers are located in the hub of the propeller, and are separated by a flexible composite diaphragm 10 carrying at its center an electrical contact 13, grounded through the diaphragm to the hub of the propeller. This diaphragm is preferably of a vibration resistant type, and comprises two flexible panels 11 spaced by a centrally apertured plate 12, through which the elongated electrical contact piece 13 passes. The space within the composite diaphragm is filled with liquid, so that motion of the panels under vibration causes liquid flow from one side of plate 12 to the other, through the restricted opening in plate 12, thus damping oscillations.

The end walls of the pressure chambers are in the form of plates 15 and 16 of insulating material, held in place by any suitable means. Centrally located on the plates are adjustable contacts 17 and 19, to cooperate with the contact 13 carried by the diaphragm. These contacts are connected through suitable slip rings 18 to a motor control device 20.

The function of the control device, which is fully described below, is to adjust the rotational speed of the driving motor 1 to maintain the speed of the propeller at such a value that the advance of the propeller with respect to the airstream will be equal to the geometric pitch of the blade. It is apparent that when this condition exists, the propeller blade will operate at zero angle of attack. Accordingly, the air flow around the blade will be symmetrical, and the pressures at the openings 3 and 4, and hence in chambers 5 and 6, will be equal. However, should either the airspeed or the motor speed vary, the blade will no longer operate at zero angle of attack, and the airflow around the blade will be unsymmetrical. In such case, a difference in pressure will exist between the two faces of the blade, which will be communicated to the corresponding faces of the diaphragm 10, causing it to deflect one way or another to close one or the other of contacts 17 or 19. This action, through the control device, causes a change in motor speed to bring about a new condition of equilibrium.

The rotational speed of the propeller is thus a direct measure of true airspeed, which can be indicated by any conventional tachometer. The tachometer illustrated is representative, comprising a pick-up unit 30 driven by the motor shaft, and a remotely positioned indicating unit 31, connected by wires 32, as is common practice.

The control device may take a number of forms, as will be apparent to any electrical engineer. The type illustrated comprises a rheostat 21 in the field circuit of the driving motor 1, which rheostat is adjusted by a control motor 22, which is in turn controlled through double relay 23 actuated through the pressure chamber contacts 17 and 19. Closing of either of these contacts will operate the relay in a corresponding direction, thus causing the control motor to rotate, also in corresponding direction, adjusting the rheostat to change the speed of the driving motor 1. In this manner the rotational speed of the propeller will always be such that it operates at zero attack angle, within small limits. The indication of the tachometer 31 will then correspond directly to true air speed, and is preferably graduated in miles per hour to read true air speed directly.

Figure 3:
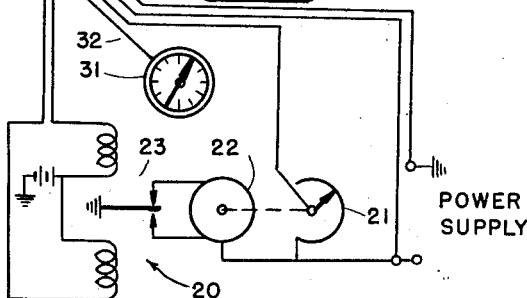
Figure 3 is a view similar to Figure 1 of a modified form of the instrument.
Figure 3:
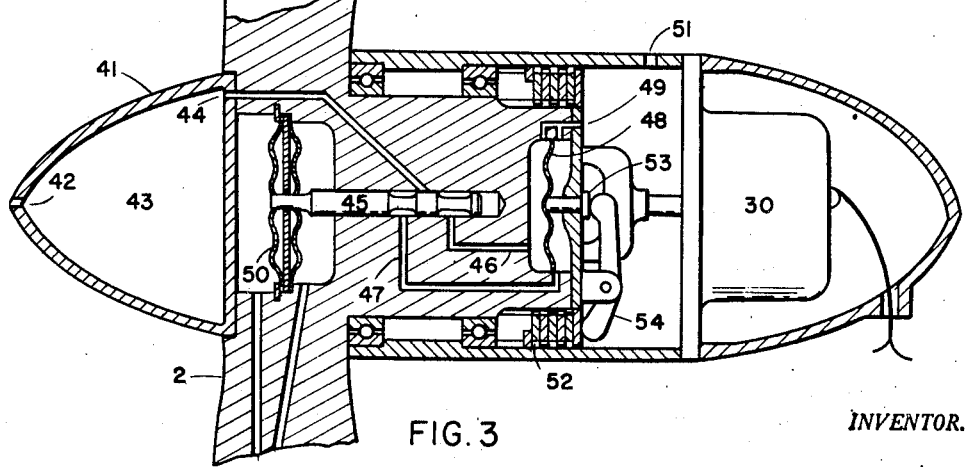

Clearly, the propeller blade may be driven by any source of power other than an electric motor, and likewise the control may be other than electrical. For example, in Figure 3 is shown an embodiment of the invention in which the sensing propeller blade is driven by a second blade, which may be termed a "power" blade, while the control is pneumatic and mechanical.

In this form, the second or power blade 40 is of lesser pitch than the sensing blade 2, so that it tends to drive the apparatus at speed slightly higher than that required to cause the sensing blade 2 to operate at zero angle of attack, and means are provided to brake the device to the correct speed. This braking means may take various forms, but to make the apparatus self-contained it is preferred to actuate the brake by use of the impact pressure of the air stream, although any other source of pressure may be used. To this end, the nose-piece 41 has a forwardly-facing opening 42 communicating, through a chamber 43, conduit 44, valve 45, and ducts 46 and 47 with a brake-operating diaphragm 48. The slide valve 45 is operated by a sensing diaphragm 50, similar to that previously described, to admit ram air from opening 42 to one side or the other of the brake-operating diaphragm 48. The spaces on either side of this latter diaphragm are vented through restricted orifices 49, and passage 51 to a region of low pressure on the exterior of the body of the apparatus. The brake-operating diaphragm 48 actuates a multiple-disk type brake 52 through plunger 53 and readily arranged levers 54.

When this apparatus over speeds, a pressure differential arises across the sensing diaphragm, as previously described, causing the valve 45 to move forwardly, admitting ram air to the forward face of the brake diaphragm 48, thus applying (or increasing the application of) the brake to retard the rotation of the apparatus to the proper speed. Conversely, reduction of rotational speed below the equilibrium condition will cause lessening brake application, permitting an increase of rotational speed.

A suitable tachometer pick-up 30 is provided to transmit the speed of rotation to a remote location.

In certain cases it may be sufficient to attain speed adjustment by manual control and thus eliminate the automatic speed control. In such case the pressure lines from the blade may be passed through suitable rotary joints and connected to a manometer, where the difference in pressure may be noted by an operator, who may adjust the rotative speed of the device. Such an arrangement would be suitable for relatively steady conditions, and is somewhat simpler than the systems described above.

From the foregoing description it will be seen that an air speed meter according to this invention will give an accurate indication of the true air speed, regardless of the condition of the atmosphere. Changes of density, whether caused by barometric variations, altitude changes or temperature fluctuations, have no effect whatsoever upon this device, as it depends only upon the maintenance of symmetrical flow about the sensing propeller blade. Centrifugal force will keep the passageways clear of moisture, which otherwise might cause difficulty. Icing, of course, will interfere with proper operation of the device, but may readily be combatted by the use of electrical heating or other means.

While this invention has been described as a true air speed meter primarily intended for use on aircraft, for the reason that it was devised in that connection, it is fully realized that the apparatus has much broader application. It will, without modification, measure the true velocity of any gas, regardless of density or temperature, or the velocity of any liquid, regardless of density, temperature or viscosity. In this connection it is of interest and importance to note that no change of calibration is required in shifting from one gas or liquid to another, or even in shifting from a gas to a liquid, or vice versa, since symmetry of flow about the symmetrical airfoil is the only condition which must be met. Variations in characteristics of the fluid have equal effect on the flow over the two faces of the sensing propeller blade, and thus have no effect upon the indication of this instrument.

The term "propeller" is used throughout this specification and in the following claims. It will be recognized that the present device exerts no propulsive effect, since the sensing blade operates at zero angle of attack, that is, at zero slip. Accordingly, the term "propeller" is used for convenience by reason of the structural similarity to the conventional screw propeller.

I claim:

1. A device for measuring velocity of fluid flow, comprising a propeller blade of symmetrical airfoil section, variable speed driving means for said blade, there being pressure pick-up apertures symmetrically located on opposite faces of said blade, conduits connecting said apertures to a device sensitive to the difference of pressures at said apertures, means operable by said pressure sensitive device to vary the speed of the driving means to bring about equality of said pressures, and means for measuring the rotational speed of the blade.

2. Apparatus for measuring velocity of fluid flow comprising: a propeller blade of symmetrical airfoil section, there being apertures symmetrically located on opposite faces of said blade, a differential pressure sensitive device, conduits connecting said device to said apertures, driving means for the blade, means operable by the pressure sensitive device to regulate the rotational speed of said blade, and means to measure such rotational speed.

3. Apparatus for measuring velocity of fluid flow comprising an axial-flow propeller having a blade of symmetrical airfoil section, apertures symmetrically located on opposite faces of said blade, differential pressure sensitive means, conduits connecting said apertures to said pressure sensitive means, electrical driving means for the propeller, control means for said driving means operatively associated with said pressure sensitive means, and means for measuring the rotational speed of said propeller.

4. Apparatus for measuring velocity of fluid flow comprising a motor, a propeller blade of symmetrical airfoil section driven by said motor, the blade having openings symmetrically located on opposite faces thereof, two chambers separated by a flexible diaphragm, a conduit connecting each of said chambers to one of said openings, means operable by motion of said diaphragm to control the rotational speed of the motor, and means for measuring such rotational speed.

5. Apparatus for measuring velocity of fluid flow comprising a propeller having a driving blade, and a sensing blade of symmetrical airfoil section, there being openings in said sensing blade symmetrically located, a differential pressure sensitive element, conduits connecting said openings with said differential pressure sensitive element, brake means for restricting the rotational speed of said propeller operable by said differential pressure sensitive element, and means to measure said rotational speed.

6. Apparatus for measuring velocity of fluid flow comprising a motor, an axial-flow propeller blade of symmetrical airfoil section driven by said motor, there being symmetrically located apertures formed in opposite faces of said blade, a speed control device for said motor including a differential pressure-sensitive device operatively connected to said apertures, and means for measuring the rotative speed of said blade.

7. An instrument for indicating velocity of fluid flow comprising a variable-speed motor, an axial-flow propeller having a blade of symmetrical airfoil section and of predetermined pitch driven by said motor, there being pressure pick-up openings symmetrically arranged on opposite faces of said blade, a differential pressure sensitive device, conduits connecting said openings to said differential pressure sensitive device, a speed control for said motor operatively connected to said differential pressure sensitive device arranged to adjust the rotative speed of the motor to a value such that the pressures existing at said openings are equal, and means to indicate such rotative speed.

MARCUS E. SMABY.

REFERENCES CITED

The following references are of record in the file of this patent:

UNITED STATES PATENTS

| Number | Name | Date |
| --- | --- | --- |
| 1,305,803 | Irwin | June 3, 1919 |
| 1,405,177 | Zahm | Jan. 31, 1922 |
| 2,355,921 | Mercier et al. | Aug. 15, 1944 |

FOREIGN PATENTS

| Number | Country | Date |
| --- | --- | --- |
| 45,219 | France | Apr. 8, 1935 |
| | (Addition to No. 780,283) | |